US007966794B2

(12) United States Patent
Thompson et al.

(10) Patent No.: US 7,966,794 B2
(45) Date of Patent: Jun. 28, 2011

(54) METHOD FOR A DRIVE SYSTEM OF AN AGRICULTURAL MACHINE WITH A FLOATING WORK TOOL

(75) Inventors: Kent L. Thompson, Otley, IA (US); Shane A. Bollinger, Leighton, IA (US); Stuart Gene Van Donselaar, New Sharon, IA (US)

(73) Assignee: Vermeer Manufacturing Company, Pella, IA (US)

( * ) Notice: Subject to any disclaimer, the term of this patent is extended or adjusted under 35 U.S.C. 154(b) by 94 days.

(21) Appl. No.: 12/701,189

(22) Filed: Feb. 5, 2010

(65) Prior Publication Data

US 2010/0132325 A1    Jun. 3, 2010

Related U.S. Application Data

(63) Continuation of application No. 11/928,082, filed on Oct. 30, 2007, now Pat. No. 7,658,056.

(51) Int. Cl.
*A01D 34/00* (2006.01)
(52) U.S. Cl. ........................................................ 56/15.8
(58) Field of Classification Search .................. 56/15.8, 56/15.7, 15.2, 15.1, 15.5, 15.4, 14.7, 378, 56/14.9; 91/394, 290, 301; 172/272, 240, 172/244, 248, 246
See application file for complete search history.

(56) References Cited

U.S. PATENT DOCUMENTS

| 3,517,491 A | 6/1970 | Harer |
| 3,587,217 A | 6/1971 | Lausch |
| 3,592,106 A | 7/1971 | Baughman |
| 3,623,300 A * | 11/1971 | Konig et al. ..................... 56/6 |
| 3,646,732 A * | 3/1972 | Konig et al. ................. 56/13.6 |
| 4,177,627 A | 12/1979 | Cicci |
| 4,207,802 A | 6/1980 | Homuth |
| 4,343,138 A * | 8/1982 | Neuerburg ..................... 56/15.9 |
| 4,344,639 A | 8/1982 | Pollard |
| 4,381,118 A | 4/1983 | Weeks |
| 4,599,852 A | 7/1986 | Kerber |
| 4,719,742 A | 1/1988 | Ermacora |
| 4,723,396 A | 2/1988 | Ermacora |
| 4,723,401 A | 2/1988 | Webster |
| 4,724,661 A | 2/1988 | Blakeslee |

(Continued)

FOREIGN PATENT DOCUMENTS

DE    4013591 A  * 10/1991

(Continued)

OTHER PUBLICATIONS

Copy—1 sheet showing a New Holland—Section 8 Hydraulic Cylinder.

*Primary Examiner* — Árpád Fábián-Kovács
(74) *Attorney, Agent, or Firm* — Sturm & Fix LLP

(57) ABSTRACT

A drive system for agricultural implements having at least one floating head and a tongue that may be disposed at various angles relative to a longitudinal angle of the implement. Two swivel gearbox assemblies are used, each comprising a first 90° gearbox rigidly attached to the implement and a second 90° gearbox that is permitted to rotate about an axis passing through one of its shafts and one of the first 90° gearbox's shaft. Because the tongue angle is variable, the drive shafts for driving the implement must take on a plurality of angles. The swiveling gearbox assemblies allow variable angles at the tongue and at the header.

10 Claims, 8 Drawing Sheets

U.S. PATENT DOCUMENTS

| | | |
|---|---|---|
| 4,991,383 A | 2/1991 | Ermarcora |
| 5,060,462 A | 10/1991 | Helfer |
| 5,062,489 A | 11/1991 | Adee |
| 5,094,063 A | 3/1992 | Wattron |
| 5,107,663 A | 4/1992 | Wattron |
| 5,199,249 A | 4/1993 | Wattron |
| 5,199,250 A | 4/1993 | Ermacora |
| 5,272,859 A | 12/1993 | Pruitt |
| 5,417,042 A | 5/1995 | Walch |
| 5,423,165 A | 6/1995 | Walch |
| 5,544,475 A | 8/1996 | Skibo |
| 5,566,535 A | 10/1996 | Pruitt |
| 5,566,536 A | 10/1996 | Krafka |
| 5,566,537 A | 10/1996 | Kieffer |
| 5,642,607 A | 7/1997 | Stephenson |
| 5,901,537 A | 5/1999 | Walch |
| 5,966,916 A | 10/1999 | Laing |
| 5,992,133 A | 11/1999 | Walch |
| 6,044,633 A | 4/2000 | Stiefvater |
| 6,055,800 A | 5/2000 | Walch |
| 6,085,501 A | 7/2000 | Walch |
| 6,101,796 A | 8/2000 | Wattron |
| 6,186,043 B1 | 2/2001 | Callies |
| 6,189,306 B1 | 2/2001 | Walch |
| 6,238,170 B1 | 5/2001 | Pingry |
| 6,250,055 B1 | 6/2001 | Franet |
| 6,260,629 B1 | 7/2001 | Toth |
| 6,273,449 B1 | 8/2001 | Harkcom |
| 6,308,504 B1 | 10/2001 | Walch |
| 6,354,382 B1 | 3/2002 | Jarman |
| 6,360,516 B1 | 3/2002 | Harkcom |
| 6,381,935 B1 | 5/2002 | Wattron |
| 6,612,102 B2 | 9/2003 | Walch |
| 6,655,118 B1 | 12/2003 | Thompson |
| 6,662,540 B1 | 12/2003 | Harkcom |
| 6,666,010 B2 | 12/2003 | Beaufort |
| 6,679,038 B2 | 1/2004 | Walch |
| 6,698,113 B1 | 3/2004 | Jones |
| 6,758,031 B2 | 7/2004 | Franet |
| 6,845,603 B1 | 1/2005 | Stephenson |
| 6,865,873 B2 | 3/2005 | Menichetti |
| 6,907,719 B2 | 6/2005 | Ligouy |
| 7,024,844 B2 | 4/2006 | Schlesser |
| 7,047,714 B1 | 5/2006 | Stephenson |
| 7,100,351 B2 | 9/2006 | Rowse |
| 7,207,166 B2 | 4/2007 | Stephenson |
| 2001/0037887 A1 | 11/2001 | Friggstad |
| 2003/0182912 A1 | 10/2003 | Boll |
| 2003/0221401 A1 | 12/2003 | Ligouy |
| 2004/0035288 A1 | 2/2004 | Hawthorne |
| 2005/0076630 A1 | 4/2005 | Tonutti |
| 2006/0090910 A1 | 5/2006 | Houck |
| 2007/0144130 A1 | 6/2007 | Geiser |

FOREIGN PATENT DOCUMENTS

| | | |
|---|---|---|
| DE | 4314250 | 7/1994 |
| DE | 4407812 | 9/1995 |
| EP | 0503395 | 9/1992 |
| EP | 1616474 | 1/2006 |
| FR | 2723503 | 2/1996 |
| GB | 2232055 | 12/1990 |
| WO | 9740660 | 11/1997 |

* cited by examiner

METHOD FOR A DRIVE SYSTEM OF AN AGRICULTURAL MACHINE WITH A FLOATING WORK TOOL

CROSS REFERENCE TO RELATED APPLICATIONS

This application is a Continuation of U.S. Ser. No. 11/928,082 filed Oct. 30, 2007, now U.S. Pat. No. 7,658,056, issued Feb. 9, 2010 entitled DRIVE SYSTEM FOR AN AGRICULTURAL MACHINE WITH A FLOATING WORK TOOL, now U.S. Pat. No. 7,658,056, issued Feb. 9, 2010, claiming priority thereto, and U.S. patent application Ser. No. 11/927,866 filed Oct. 30, 2007 and U.S. patent application Ser. No. 11/928,010 filed Oct. 30, 2007 are hereby incorporated by reference herein in their entirety.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement, including a floating work tool. More particularly, the present invention relates to an improved drive system for agricultural implements having one or more floating work tools.

2. Background Art

Some towable agricultural implements require that the implement be towed off to one side of the tractor when in operation—possibly with the ability to be towed on either side—and directly behind the tractor for transport. The towing at these various locations is effected by angling the implement tongue relative to an implement longitudinal axis, while maintaining an orientation of an implement frame with respect to that longitudinal axis. The need for this flexibility presents difficulties in providing shaft power smoothly to the implement regardless of the tongue angle. Universal joints are relatively inexpensive and permit changes of drive direction, but reduce energy transfer efficiency, are unable to accommodate great angles, and produce oscillating power transfer when at and angle. Furthermore, universal joints require regular maintenance and eventual replacement.

There is, therefore, a need for a method and apparatus for providing shaft power to towed implements having the ability to operate with varying tongue angles.

BRIEF SUMMARY OF THE INVENTION

An object of the present invention is to provide a drive system for a towed implement, such as an agricultural mower, permitting:

the implement tongue to be angled through a range of angles relative to a longitudinal axis of the implement;
a header of the implement to be raised and lowered; and
the implement header to be positioned for both transport and operation.

To effect the various aspects of the above object, two pairs of swiveling gearboxes are utilized, wherein the axis of rotation associated with their ability to swivel is vertical. Additionally, the drive shaft connecting a given pair of gearboxes rotates about the same axis of rotation. Each of the gearboxes in each pair alters the drive direction by 90°.

A tongue gearbox system comprises a swiveling pair of gearboxes wherein the upper gearbox is rigidly affixed to the underside of the implement tongue while the lower gearbox is free to rotate about the vertical axis of rotation. The lower gearbox receives shaft power directly from the tractor Power Takeoff (PTO). The upper gearbox passes the shaft power along the drive shaft running to the implement. Because the lower gearbox can rotate relative to the tongue, the tongue may be angled through a range of angles relative to the longitudinal axis of the mower without inhibiting the shaft power transmission in any way. Hence, the implement may be towed directly behind the tractor or swung to either side of the tractor.

A sub-frame gearbox system comprises a swiveling pair of gearboxes wherein the lower, sub-frame gearbox is rigidly affixed to the sub-frame while the upper gearbox is free to rotate about the vertical axis of rotation. The implement tongue may be angled through a range of angles relative to the sub-frame and the upper gearbox swivels relative to the sub-frame to accommodate the various drive shaft angles. The sub-frame gearbox provides a 90° drive-angle change to drive the work tool(s).

Gear ratios may be selected for these swiveling gearbox assemblies as needed for a given application.

Other objects, advantages and novel features of the present invention will become apparent from the following detailed description of the invention when considered in conjunction with the accompanying drawings.

DETAILED DESCRIPTION OF THE INVENTION

Figure 1A:
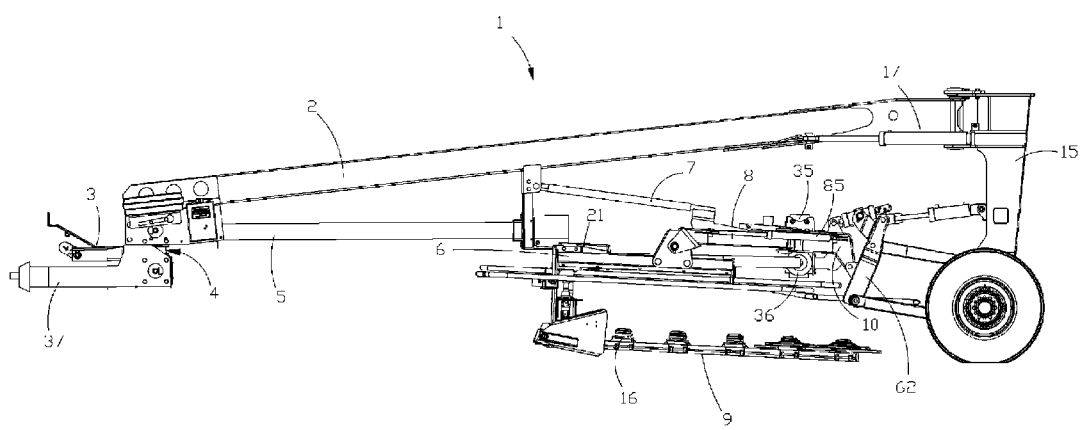
FIG. 1a is a side elevation of an agricultural mower in a transport configuration.

Referring now to the drawings wherein like reference numerals indicate identical or corresponding parts throughout the several views, the present invention comprises a suspension system for an agricultural mower 1, shown in its entirety in FIGS. 1a-2c, and 5. The present invention relates to a drive system capable of transmitting rotation from a Power Takeoff (PTO) shaft of a towing tractor to the cutters of an agricultural mower having multiple frames able to pivot and rotate as described in U.S. patent application Ser. No. 11/927,866, filed Oct. 30, 2007, which is hereby incorporated in its entirety by reference. The multi-frame mower 1 having the aforementioned motions enables the cutter bars 9 to float on the ground. Float provides the ability to engage the ground surface such that a consistent cut height is achieved. This desirable quality held by such a mower 1 requires the driveshaft configuration of the present invention.

In one embodiment, a two-point arm structure 3 is used to connect the mower tongue 2 to the two lower links of a 3-point tractor linkage (not shown) properly positioning the mower 1 such that the PTO shaft from the tractor can be connected to the tongue gearbox system 4 via an implement driveline 37 comprising a universal joint. The two-point arm 3, as particularly illustrated in FIG. 3, is connected to the tractor links by cylindrical pins 75 which pass through spherical bearings, or ball joints, in the tractor links to allow for ground slope variations in the direction of travel as well as relative roll angle between the tongue 2 and the tractor.

For the purposes of this document, including the claims, the usual direction of travel is hereby defined as the direction the agricultural mower 1 is drawn during mowing. For instance, in FIGS. 1a, 1b, and 5, said usual direction of travel is to the left.

Figure 5:
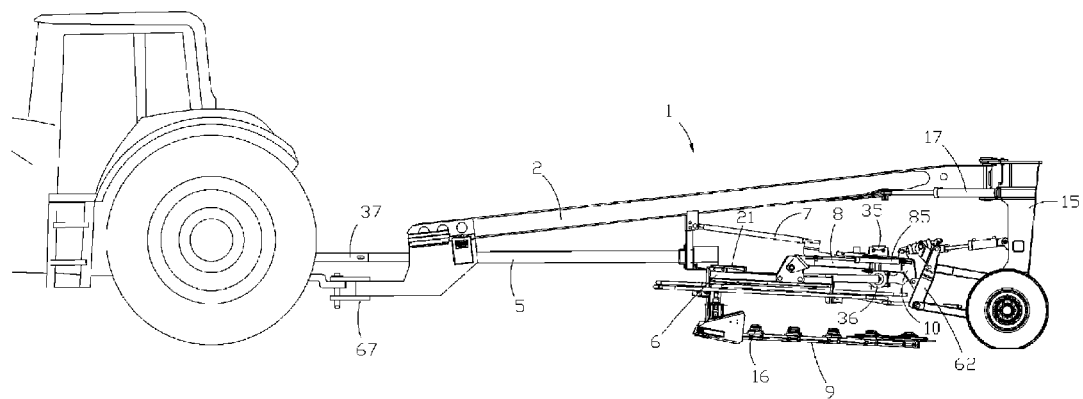
FIG. 5 is a side elevation of an agricultural mower in a transport configuration.

An alternative embodiment of the hitch system is shown in FIG. 5. In this embodiment, the tongue 2 is attached to a tractor drawbar by a pin-type hitch 67, thereby properly positioning the mower 1 to permit the tractor PTO shaft to be connected to a tongue jack-shaft (not shown) via an implement driveline 37 comprising a universal joint. The main shaft 5 connects to the jack shaft at the front of the tongue 2.

Figure 1B:
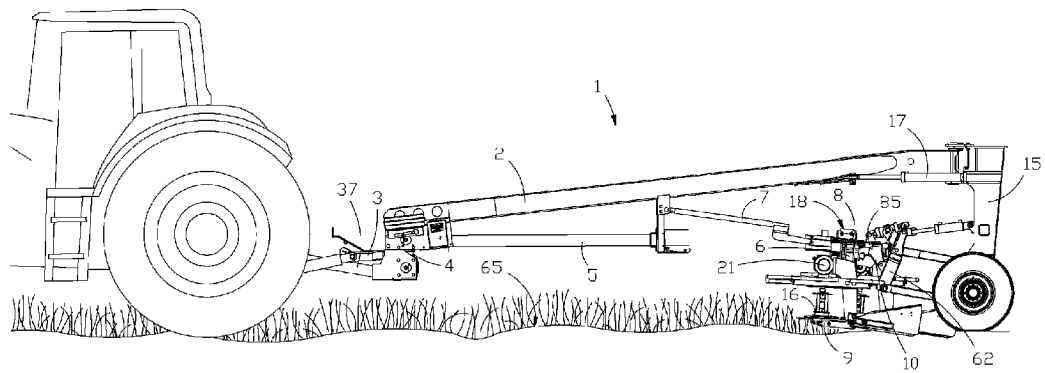
FIG. 1b is a side elevation of the agricultural machine in an operating configuration.
Figure 2A:
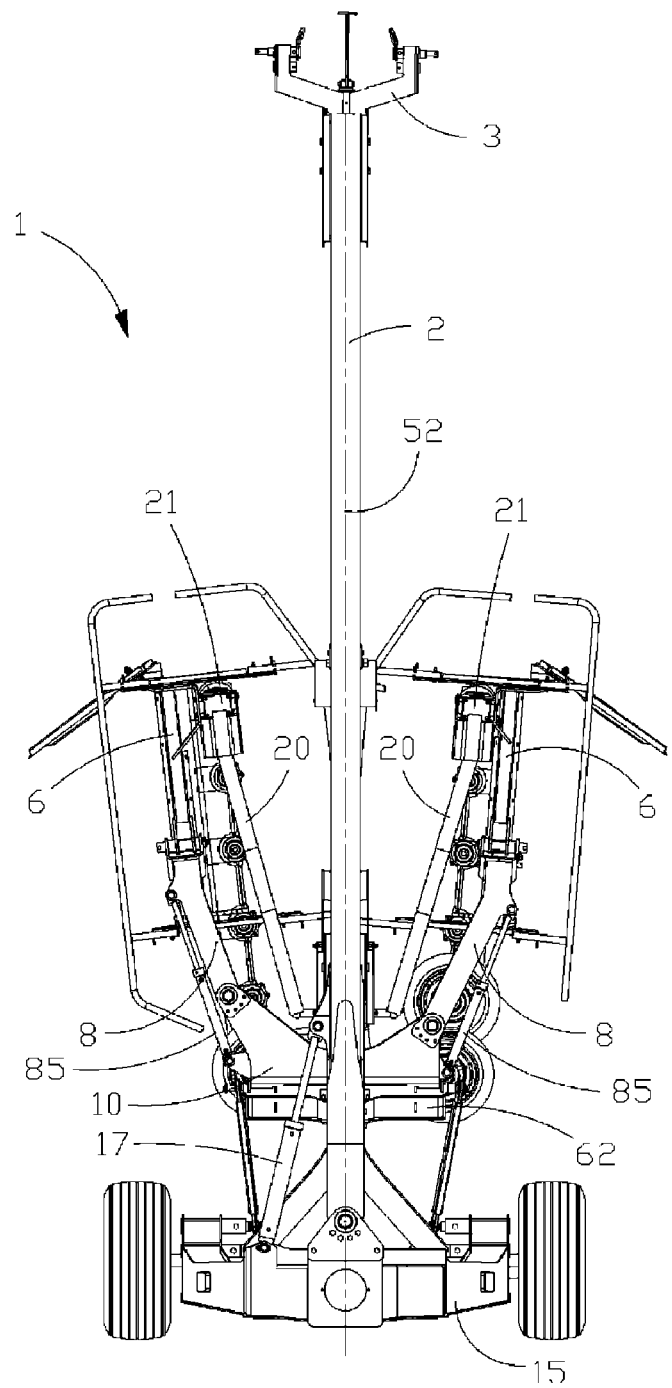
FIG. 2a is a top plan view of the agricultural mower with a sub-frame in the transport configuration.
Figure 2B:
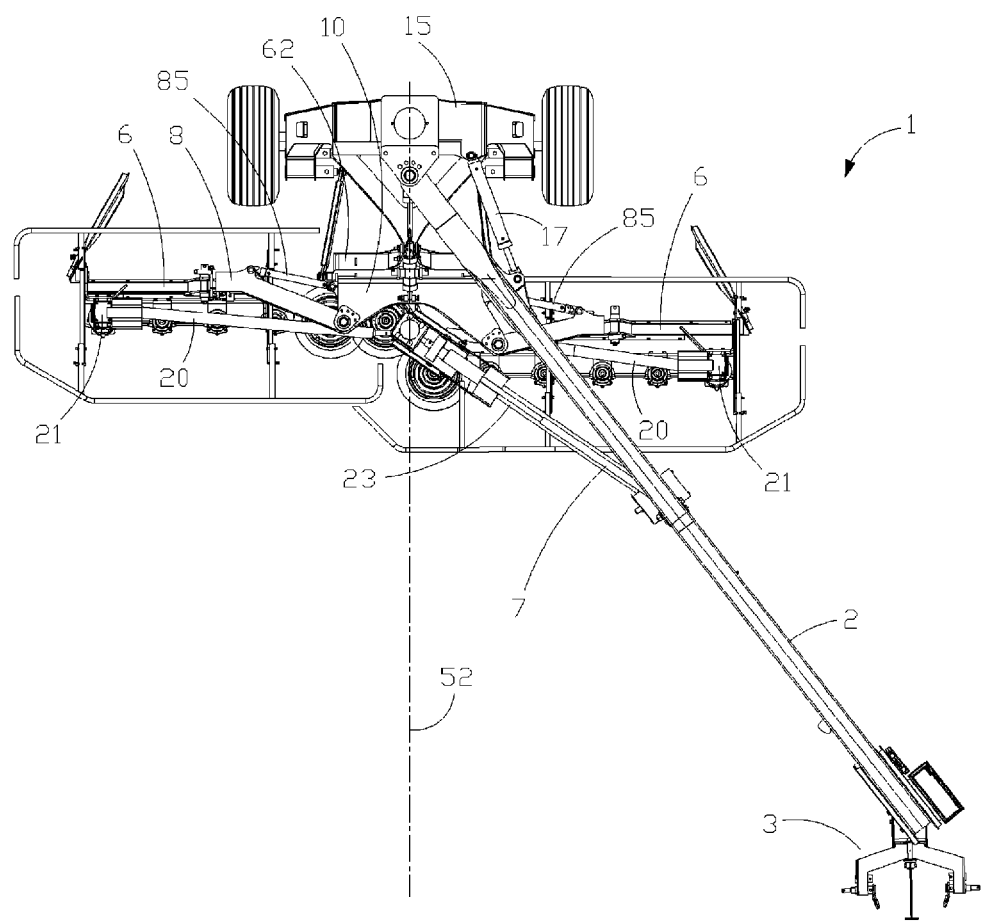
FIG. 2b is a top plan view of the agricultural mower with the sub-frame in the operating configuration and the mower trailing to the right of a tractor.
Figure 2C:
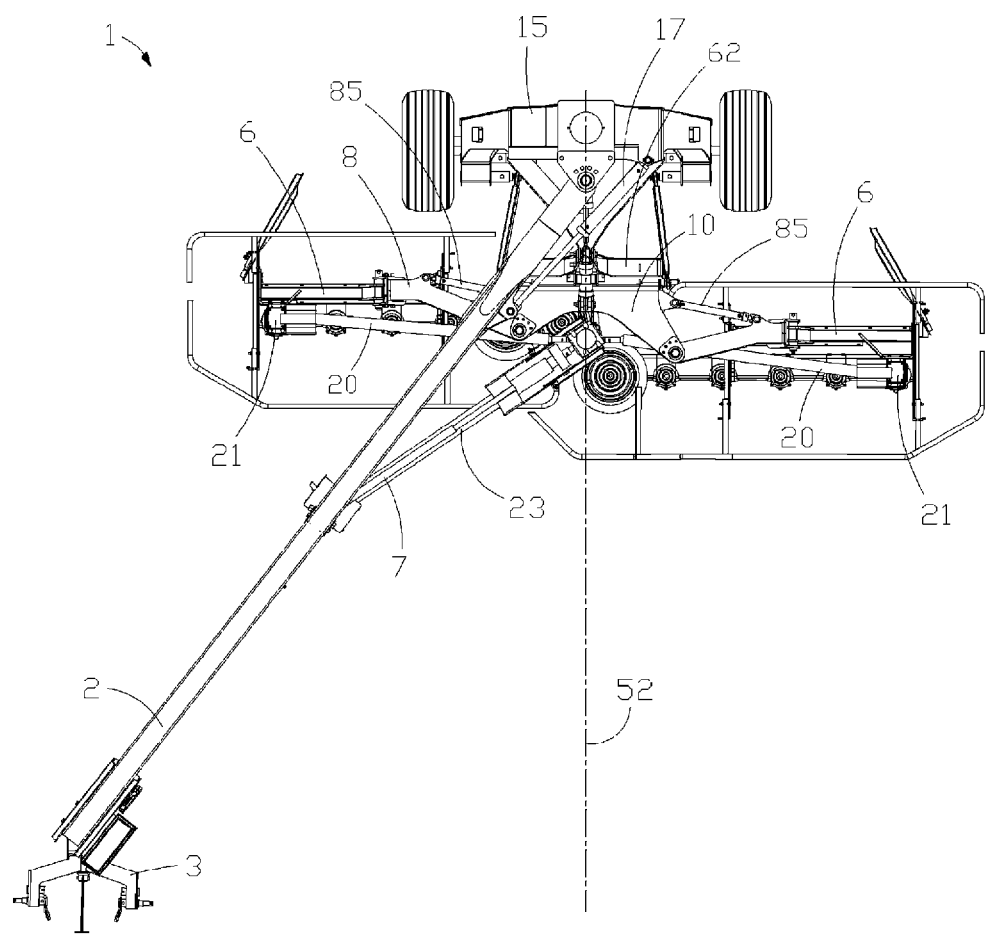
FIG. 2c is a top plan view of the agricultural mower with the sub-frame in the operating configuration and the mower trailing to the left of the tractor.
Figure 3:
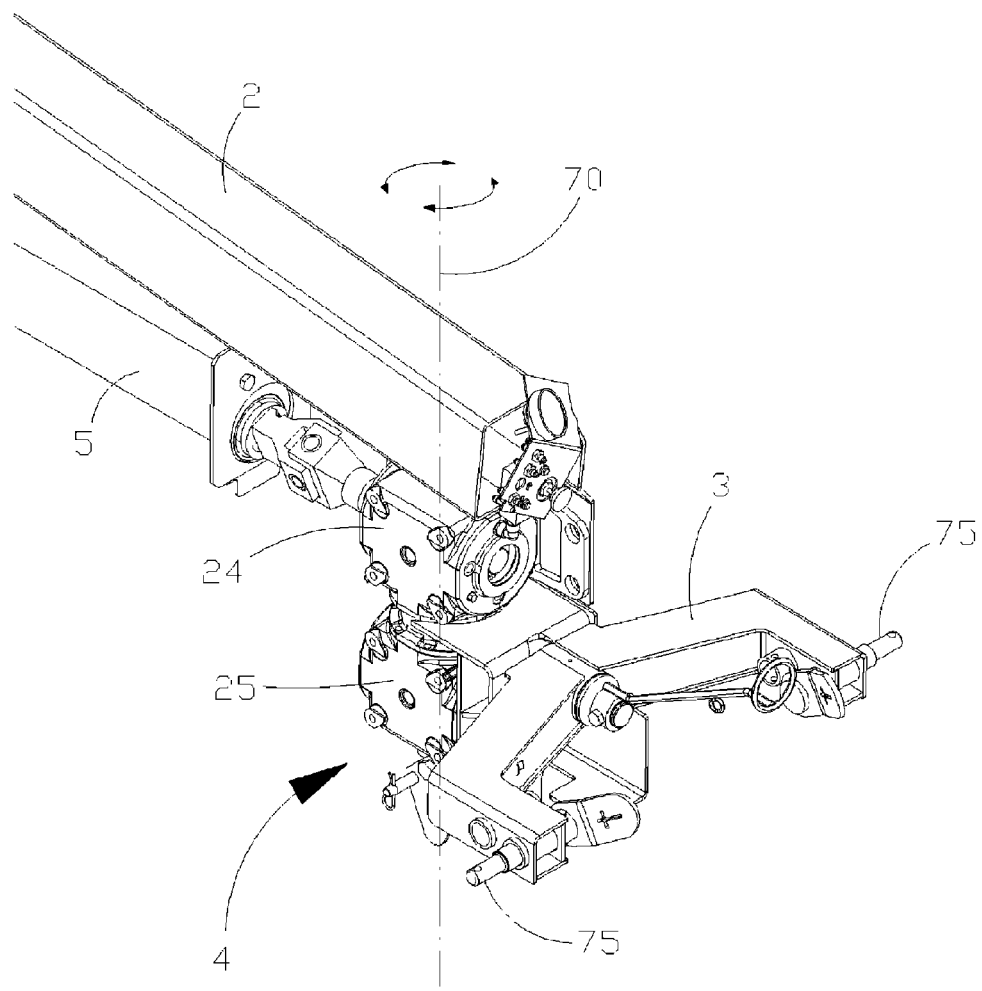
FIG. 3 is a perspective view of the tongue gearboxes, pivotally connected with a vertical axis.

The tongue gearbox system 4 is comprised of an upper gearbox 24 and a lower gearbox 25, shown in FIG. 3, which each alter the axis of rotation of the driveshaft by 90° and also can provide gear reduction. The two gearboxes 24, 25 are pivotally connected with a common shaft defining a vertical axis of rotation 70. This assembly is a swiveling gearbox assembly 4 which allows the upper gearbox 24 to be rigidly mounted to the tongue while allowing the lower gearbox 25 to rotate freely about the vertical axis of rotation 70. With this configuration, the tractor may be positioned by angling the tongue to various angles relative to the longitudinal axis 52 of the agricultural mower 1. This allows the mower 1 to be positioned in a wide variety of locations relative to the towing machine, two of which are illustrated in FIGS. 2b and 2c. The collective change in the orientation of the drive axis of rotation, in the elevational plane, is 0°, as shown in FIG. 1b, such that the main shaft 5 exiting the rear of the tongue gearbox system 4 has an axis of rotation in the longitudinal direction. The rear end of this shaft 5 is supported by a strut mounted on the underside of the tongue 2, and further connects via a universal joint or a Constant Velocity (CV) joint to a secondary shaft 23 (see FIGS. 2b and 2c) which transmits drive power rearward to the upper sub-frame gearbox 35 (FIG. 1a). The output shaft of the upper sub-frame gearbox 35 is also the input shaft of the lower sub-frame gearbox 36, making these two gearboxes 35, 36 a swiveling pair, referred to here as the "sub-frame gearbox system" 18, as described for the tongue gearbox system 4. In the sub-frame gearbox system 18, the lower sub-frame gearbox 36 is rigidly mounted to the sub-frame 10 while the upper sub-frame gearbox 35 rotates freely to stay generally aligned with the tongue 2, via a steering link or steering bar 7. A benefit of the secondary shaft 23 is that the secondary shaft 23 may be oriented at a variable angle with the tongue 2 such that the sub-frame 10 can be raised or lowered relative to the tongue 2 and main frame 15.

The secondary shaft 23 is connected to the sub-frame gearbox system 18 via a universal joint or a constant velocity joint and through a friction clutch 22 which is in-line such that under excessive torque it will disengage the drive system, as is well understood by those of ordinary skill in the art. The swiveling sub-frame gearbox system 18 permits the driveshaft 5, 23 to perform its function even when the tongue 2 is not orthogonal to the sub-frame 10. Clearly, such is allowed by the pivotal mounting of the tongue to the main frame 15, controlled by a swing cylinder 17. A steering bar 7 extends between the sub-frame gearbox system 18 and the tongue strut, and is connected such that the sub-frame 10 is allowed to lift and lower. The upper gearbox 35 alters the axis of rotation of the shaft by 90° into the lower gearbox 36 which changes the rotation angle by 90° again and transmits the rotation into shafts extending out to the headers 6 via universal joints.

The arms 8 are pivotally connected to the sub-frame 10 such that they may rotate about a vertical axis of rotation between a transport position (FIGS. 1a, 2a, and 5) and a mowing position (FIGS. 1b, 2b, and 2c). In the transport position, the arms 8 rotate to a position such that the cutter bars 9 are substantially parallel to the longitudinal axis 52. In the mowing position, the arms rotate to a position such that the cutter bars 9 are substantially perpendicular to the longitudinal axis 52, and are slightly offset relative to one another. The ability to fold in the arms 8 for transport enables a wide-cut agricultural mower 1 to be narrowed sufficiently for legal transport on U.S. roadways. Additionally, because the cutter bars 9 fold within a horizontal plane, the center of mass of the agricultural mower 1 remains low, enhancing stability.

Folding is effected by a folding cylinder 85. Because the folding of the cutter bars 9 does not entail lifting the cutter bars 9, folding may alternatively be performed manually. Folding the cutter bars 9 on a vertical pivot axis 69 on which the arms 8 pivot to the transport position, makes the agricultural mower 1 very stable when compared with the alternative of folding on a horizontal pivot axis. Offsetting the arms 8 and slightly overlapping them in the transverse direction allows the cutter bars 9 to rotate independently, while not missing any crop or being in danger of having their blades impact each other. With the cutterbars 9 offset, the mower is better able to follow the ground contour.

Figure 4:
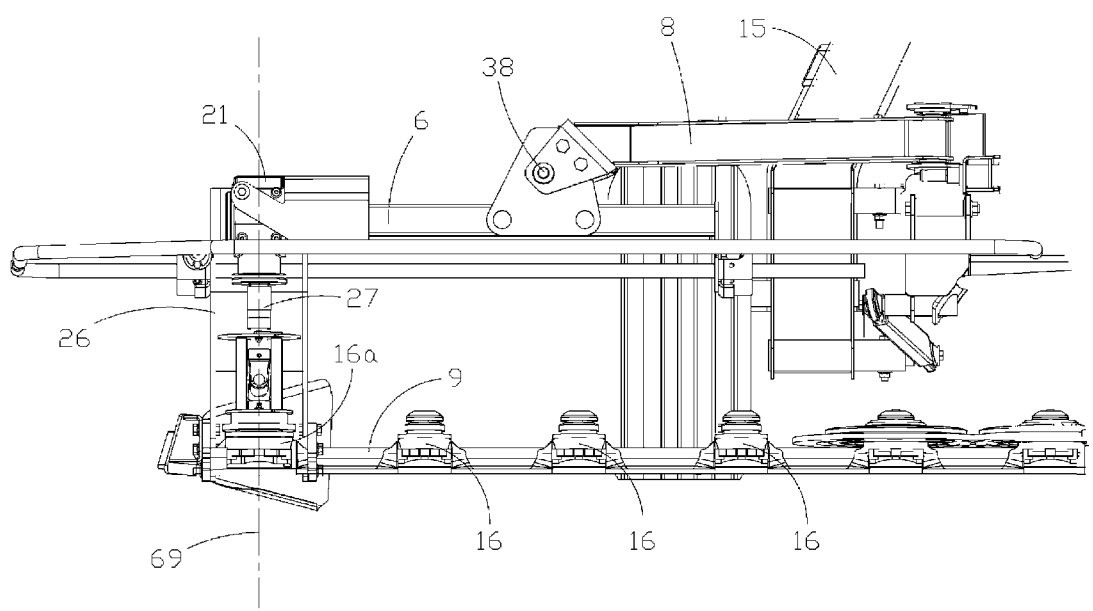
FIG. 4 is a front elevation view of the cutter bar mounted beneath the header at an outer end.

The arm shafts 20 are connected to the lower sub-frame gearbox 36 via universal joints which allow the arms 8 to rotate inward for transport or outward for mowing. In the transport position the universal joints are not intended to allow rotation of the arm shafts 20. Each arm 8 pivotally supports a header 6 with a cylindrical bearing 38 as shown in FIG. 4. This allows rotation of the header 6 with an axis of rotation perpendicular to that header 6, which in the mowing position allows the cutter bars 9 to follow the terrain. The header 6 supports a cutter bar 9 on its outer end by a vertical support structure 26 which is rigidly connected to the header 6. The header 6 further includes a 90° gearbox 21 located at the outer end of the header 6. This entire assembly has a center of gravity approximately located at the pivot point 38, such that the cutter bar 9 will remain level when the header 6 is suspended by the arm 8. The 90° gearbox 21 of each header 6 accepts the arm shafts 20 through universal or CV joints to transmit the rotation through vertical shafts 27 leading to the cutter bars 9. The universal or CV joints allow for the pivoting of the header 6 with respect to the arm 8. Preferably, the cutter bars 9 themselves are supported from above only at their outer ends by the vertical support structure 26, such that the cutter bars 9 are cantilevered from that point inward. The drive shaft to the cutter bar 27 is aligned with this vertical support structure 26, such that the cutter bar supporting structure and drive are in the same space, minimizing disruption to the flow of cut material.

Located at the outer end of each cutter bar 9, a first disk 16a is mounted atop the cutter bar 9. This first disk 16a is specifically designed for accepting the driveshaft 27 from above via a universal joint. The driveshaft 27 is protected by a drum which throws cut material to the side of the driveshaft and discourages wrapping on the shaft as it extends downward from the header 6. The first disk 16a as well as subsequent disks 16 spaced along the cutter bar 9 self-contain small 90° gearboxes. A hexagonal shaft connects the row of cutter disks 16*a*, 16 and rotates with an axis of rotation substantially parallel to the arm 8. Blades mounted to the cutter disks 16*a*, 16 are rotated about the vertical axis of each disk 16*a*, 16 to cut the crop.

The novel drive system herein described may be utilized for any implement making use of a floating work tool. The invention is not intended to be limited to agricultural mowers.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method of providing drive to a mower said mower comprising a sub-frame and a main frame, the mower having an inner end and an outer end and an operating position and a transport position, the method comprising:
   (a) disposing a first driveshaft near the main frame;
   (b) operatively connecting the first driveshaft to an input shaft of a first gearbox;
   (c) operatively supporting said first gearbox on the main frame;
   (d) operatively connecting a first end of a second driveshaft to an output shaft of the first gearbox;
   (e) operatively connecting a second end of the second driveshaft to an input shaft of a second gearbox;
   (f) operatively supporting the second gearbox on the sub-frame;
   (g) disposing the second gearbox near the outer end of a toolbar of the mower;
   (h) operatively connecting a first end of a third driveshaft to an output shaft of the second gearbox;
   (i) operatively connecting a second end of the third driveshaft to the outer end of the toolbar; and
   (j) folding the toolbar of the mower on a substantially vertical axis between said operating position and said transport position.

2. The method of claim 1 wherein the toolbar comprises a first toolbar and the substantially vertical axis comprises a first substantially vertical axis, also the mower comprises a second toolbar and a centerline parallel to a usual direction of travel for the mower, the method additionally comprising:
   (a) operatively, pivotally attaching the first toolbar to the sub-frame on a first substantially vertical axis of pivot;
   (b) operatively, pivotally attaching the second toolbar to the sub-frame on a second substantially vertical axis of pivot;
   (c) disposing the first toolbar substantially orthogonal to the mower centerline;
   (d) disposing the second toolbar substantially orthogonal to the mower centerline;
   (e) pivoting the first toolbar on the first substantially vertical axis to cause the outer end of the first toolbar to be disposed nearer the mower centerline than when the first toolbar is disposed substantially orthogonal to the mower centerline; and
   (f) pivoting the second toolbar on the second substantially vertical axis to cause the outer end of the second toolbar to be disposed nearer the mower centerline than when the second toolbar is disposed substantially orthogonal to the mower centerline.

3. The method of claim 1 wherein operatively supporting the first gearbox on the main frame comprises operatively, rigidly attaching the first gearbox to the main frame.

4. The method of claim 1 wherein operatively supporting the second gearbox on the sub-frame comprises operatively, rigidly attaching the second gearbox to the sub-frame.

5. The method of claim 1 additionally comprising applying shaft power provided by the third driveshaft to the toolbar of the mower.

6. A method of providing drive to a work tool, said work tool comprising a sub-frame and a main frame, the work tool having an inner end and an outer end and an operating position and a transport position, the method comprising:
   (a) disposing a first driveshaft near the main frame;
   (b) operatively connecting the first driveshaft to an input shaft of a first gearbox;
   (c) operatively supporting the first gearbox on the main frame;
   (d) operatively connecting a first end of a second driveshaft to an output shaft of the first gearbox;
   (e) operatively connecting a second end of the second driveshaft to an input shaft of a second gearbox;
   (f) operatively supporting said second gearbox on the sub-frame;
   (g) disposing the second gearbox near the outer end of a toolbar of the work tool;
   (h) operatively connecting a first end of a third driveshaft to an output shaft of the second gearbox;
   (i) operatively connecting a second end of the third driveshaft to the outer end of the toolbar of the work tool; and
   (j) folding the toolbar of the work tool about a substantially vertical axis between said operating position and said transport position.

7. The method of claim 6 wherein the toolbar comprises a first toolbar and the substantially vertical axis comprises a first substantially vertical axis, also the work tool comprises a second toolbar and a centerline disposed parallel to a usual direction of travel for the work tool, the method additionally comprising:
   (a) operatively, pivotally attaching the first toolbar to the sub-frame on a first substantially vertical axis of pivot;
   (b) operatively, pivotally attaching the second toolbar to the sub-frame on a second substantially vertical axis of pivot;
   (c) disposing the first toolbar substantially orthogonal to the work tool centerline;
   (d) disposing the second toolbar substantially orthogonal to the work tool centerline;
   (e) pivoting the first toolbar on the first substantially vertical axis to cause the outer end of the first toolbar to be disposed nearer the work tool centerline than when the first toolbar is disposed substantially orthogonal to the work tool centerline; and
   (f) pivoting the second toolbar on the second substantially vertical axis to cause the outer end of the second toolbar to be disposed nearer the work tool centerline than when the second toolbar is disposed substantially orthogonal to the work tool centerline.

8. The method of claim 6 wherein operatively supporting the first gearbox on the main frame comprises operatively, rigidly attaching the first gearbox to the main frame.

9. The method of claim 6 wherein operatively supporting the second gearbox on the sub-frame comprises operatively, rigidly attaching the second gearbox to the sub-frame.

10. The method of claim 6 additionally comprising applying shaft power provided by the third driveshaft to the toolbar of the work tool.

\* \* \* \* \*